United States Patent [19]
Chaton et al.

[11] Patent Number: 5,978,134
[45] Date of Patent: Nov. 2, 1999

[54] LOW-PASS FILTER FOR THE UV BAND OF THE ELECTROMAGNETIC SPECTRUM

[75] Inventors: Patrick Chaton, Theys; Jean Dijon, Champagnier, both of France

[73] Assignee: Commissariat a L'Energie Atomique, Paris, France

[21] Appl. No.: 09/085,713

[22] Filed: May 28, 1998

[30] Foreign Application Priority Data

May 30, 1997 [FR] France ................................... 97 06673

[51] Int. Cl.⁶ .............................. G02B 1/10; G02B 5/28; B05D 5/06
[52] U.S. Cl. ........................ 359/360; 359/585; 359/589; 427/167
[58] Field of Search ..................... 359/359, 360, 359/361, 585, 589; 427/162, 164, 166, 167, 165

[56] References Cited

U.S. PATENT DOCUMENTS

| | | |
|---|---|---|
| 3,015,253 | 1/1962 | Foreman et al. . |
| 3,744,870 | 7/1973 | Tomiki et al. . |
| 3,936,136 | 2/1976 | Ikeda et al. . |
| 4,997,241 | 3/1991 | Muratomi ................................ 359/359 |
| 5,237,447 | 8/1993 | Mardesich et al. . |

*Primary Examiner*—Jon Henry
*Attorney, Agent, or Firm*—Oblon, Spivak, McClelland, Maier & Neustadt, P.C.

[57] ABSTRACT

The invention relates to a low-pass optical filtering device for the UV band, comprising:

a dielectric stacking (14) ensuring an anti-reflective function for $\lambda < \lambda_c$, where $\lambda_c$ is a so-called cutoff wavelength, of less than 300 nm, a metal base (12) ensuring a reflective function for $\lambda > \lambda_c$.

15 Claims, 5 Drawing Sheets

LOW-PASS FILTER FOR THE UV BAND OF THE ELECTROMAGNETIC SPECTRUM

TECHNICAL FIELD AND PRIOR ART

The field to which the invention refers pertains to thin film optical components. This invention relates to the field of optical or optronic systems, as well as to the field of astrophysical imaging.

The invention is for implementing a low-pass filtering function. It can be used to obtain a function for blocking wavelengths exceeding a critical value located in the ultraviolet region and an anti-reflective function below this particular value.

Most low-pass filters in the ultraviolet region use stackings of dielectric thin films consisting of alternating films with a high refractive index (marked H) and with a low refractive index (marked B). This structure is deposited on a glass medium (called substrate). It enables the implementation of a function for rejecting certain wavelengths. The optimum value of the reflectance factor for a wavelength $\lambda_0$ is obtained if the mechanical thickness of the different films complies with these two simple rules:

$$n_h e_h = \lambda_0/4, \; n_b e_b = \lambda_0/4 \quad (1)$$

where $e_h$ and $e_b$ are respectively the values of the mechanical thickness of the films H and B. $n_h$ and $n_b$ are respectively the values of the refractive indices of the films H and B for the wavelength $\lambda_0$.

With this simple rule, it is possible to reach values of the electromagnetic wave reflectance factor that are very close to 1. Typically, transmission loss values of several ppm (parts per million) can be reached. The spectral width $\Delta\lambda$ obtained is directly linked to the index offset $\Delta n$ between the films H and B. It can be approximated by this simple equation:

$$\Delta n/\langle n\rangle = (1/4\pi) \Delta\lambda/\lambda_0$$

where $\langle n \rangle$ represents the mean stacking index and $\lambda_0$ the center wavelength.

Using these two properties, it is possible to design a stacking with a maximum reflectance factor (>90%) within a large spectral range (e.g., the visible region). For this purpose, dielectric mirrors, the center wavelengths $\lambda_0$ of which are offset, just have to be superposed. This is called an "offset mirror" structure.

Such a structure is shown in FIG. 1 where the reference numbers 2, 4, 6 respectively designate a first mirror with a center wavelength $\lambda_{01}$, an i-th mirror with a center wavelength $\lambda_{0i}$ and an N-th mirror with a center wavelength $\lambda_{0N}$. The whole is formed on a substrate 8.

Due to this structure, it is possible to obtain a low-pass filtering function because the wavelengths located outside the spectral bands of the mirrors are not reflected.

By way of example, the optical reflectance and transmission properties of such a structure (with two offset mirrors) are provided in FIGS. 2A and 2B.

FIG. 2A shows the transmission curve (T) at a linear scale and FIG. 2B shows the transmission curve at a logarithmic scale.

To obtain an almost perfect low-pass function, a mathematical optimization of the thickness can be envisaged. In this case, the thickness no longer completely fulfils the equations provided above. FIGS. 3A and 3B show the transmission curve (T) of an optimized offset mirror filter at a linear scale and at a logarithmic scale.

The disadvantages of this "offset mirror" structure first of all lie in the overall thickness of the stacking, if it is desired to obtain very low transmission values in the spectral blocking region. This can cause mechanical reliability problems for the treatment. Beyond a certain critical thickness, which depends on the material combination chosen as well as on the deposition technique, the stacking may become unfeasible. In the case shown above (FIGS. 3A and 3B), the total filter thickness is 5.35 $\mu$m.

Moreover, a blocking function covering a very large spectral region (e.g. all wavelengths exceeding the cut-off wavelength) cannot be envisaged with a structure entirely based on dielectric films.

Therefore, the problem arises to obtain rather thin treatments with a very high rejection level beyond the cut-off wavelength. Preferably, the rejection level extends into a large spectral region (up to thermal infrared). It is also preferred that the transmission is greater than 90% in the UV band.

DESCRIPTION OF THE INVENTION

The proposed structure consists of associating a conventional dielectric stacking ensuring the anti-reflective function in the UV band with a metal base ensuring the blocking function in the complementary part of the spectrum. The critical wavelength from which all waves are stopped is given by the metal's plasmon frequency.

It should be noted that the dielectric structure can assist in improving the reflective properties of the metal in its opacity region ($\lambda > \lambda_c$). Thus, it is possible to obtain a gate transmission and reflection function.

More in detail, the object of the invention is a low-pass optical filtering device for the UV band comprising:
a dielectric stacking ensuring the anti-reflective function for $\lambda < \lambda_c$ where $\lambda_c$ is a so-called cutoff wavelength, of less than 300 nm,
a metal base ensuring a reflective function for $\lambda < \lambda_c$.

The combination obtained does not require a very thick dielectric stacking: a thickness comprised between about one hundred nanometers and several $\mu$m is sufficient.

The constituent metal of the base can be an alkaline or alkaline-earth metal having cutoff wavelengths in the UV band.

Furthermore, one or several thin film components with anti-reflective properties can be deposited on the device.

As for the dielectric stacking, it can be made of alternating MgO or $Al_2O_3$ films and $MgF_2$ films, or else of alternating $Al_2O_3$ films and $SiO_2$ films.

A stacking made of alternating fluorides (e.g. $YF_3$/LiF) has very good transparency properties in the UV band.

Finally, the device or the dielectric stacking can be of the offset mirror type.

Another object of the invention is a method for creating a low-pass optical filtering device for the UV band, comprising the following steps:
creating a dielectric stacking ensuring an anti-reflective function for $\lambda < \lambda_c$ where $\lambda_c$ is a so-called cutoff wavelength, of less than 300 nm,
creating, on this dielectric stacking, a metal base ensuring a reflective function for $\lambda > \lambda_c$.

Another object of the invention is a method for creating a low-pass optical filtering device for the UV band, comprising the following steps:
a. creating, on a UV transparent substrate, a metal base ensuring a reflective function for $\lambda > \lambda_c$, where $\lambda_c$ is a so-called cutoff wavelength, of less than 300 nm, b. creating, on the metal base, a stacking of dielectric films ensuring an anti-reflective function for $\lambda<\lambda_c$.

BRIEF DESCRIPTION OF THE FIGURES

At any rate, the features and advantages of the invention will become more apparent when reading the following description. This description concerns embodiments provided by way of explanation and without any restriction, in conjunction with the accompanying drawings where:

FIGS. 6A to 7B are transmission curves for devices according to the invention.

DETAILED DESCRIPTION OF THE EMBODIMENTS OF THE INVENTION

Figure 1:
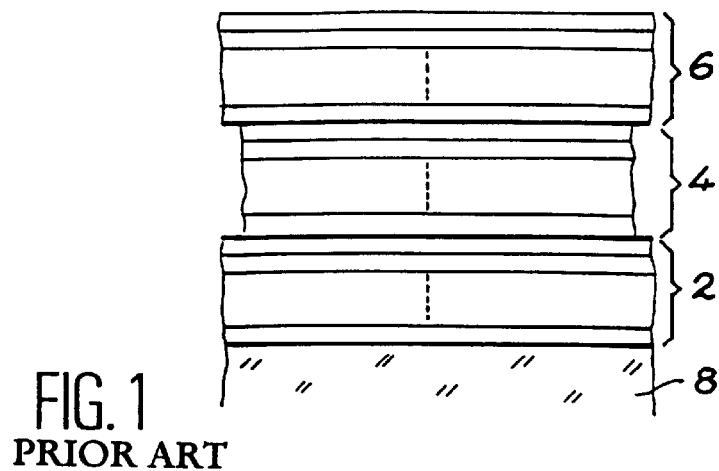
FIG. 1 shows a filter structure according to prior art.
Figure 4:
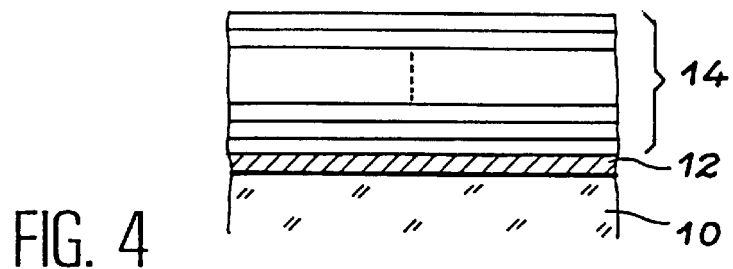
FIG. 4 shows a filter structure according to the invention.

FIG. 4 shows a sample structure according to the invention.

A dielectric structure 14 consisting of several films is deposited directly on a metal film 12. The dielectric stacking ensures the anti-reflective function on the thin metal film. The metal film ensures the blocking function for wavelengths greater than the corresponding cutoff wavelength. The thickness of the metal base can be adjusted depending on the desired rejection level.

For the specific case of the UV spectral band, a metal is chosen from the category of metals with a plasmon frequency corresponding to wavelengths between 300 and 250 nm. This electronic property is true for all alkaline metals such as rubidium, potassium or sodium. The cutoff wavelengths of some of these metals are provided in table I.

TABLE I

| ALKALINE METALS | INDICATION OF CUTOFF WAVELENGTH |
| --- | --- |
| Rubidium Rb | 255 nm |
| Sodium Na | 300 nm |
| Potassium K | 255 nm |

For offsetting the cutoff wavelength, alkaline-earth metals such as magnesium or calcium can be used.

The exact value of the cutoff wavelength depends on the metal chosen. For alkalines, $\lambda_c<300$ nm.

The whole stacking lies on a substrate that is UV transparent (up to 200 nm for UV silica, up to 150 nm for fluorides, $CaF_2$, or LiF) and possibly opaque to a number of wavelengths greater than the critical wavelength.

According to an embodiment, an alkaline metal film is deposited on a substrate that is transparent in the UV band, for instance a type S300 (suprasil) silica substrate. For this kind of deposition, vapor deposition techniques can be envisaged (electron gun or Joule effect vapor deposition, . . . ).

In this case, it is preferable to use a substrate base cooled below the melting point of the metal to be deposited (e.g. temperature of liquid nitrogen).

An offset mirror structure is then deposited on the metal film to improve the reflectance factor in the opacity area of the metal.

Figure 5A:
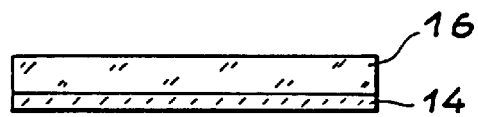
FIGS. 5A and 5B show the steps for creating a filter according to the invention.
Figure 5B:
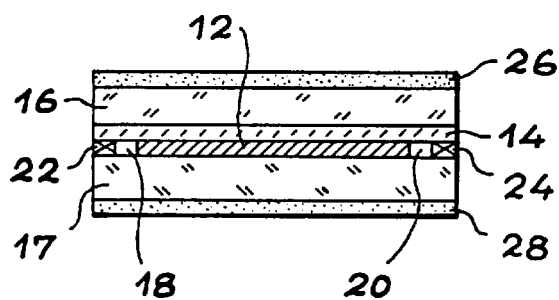
Figure 2A:
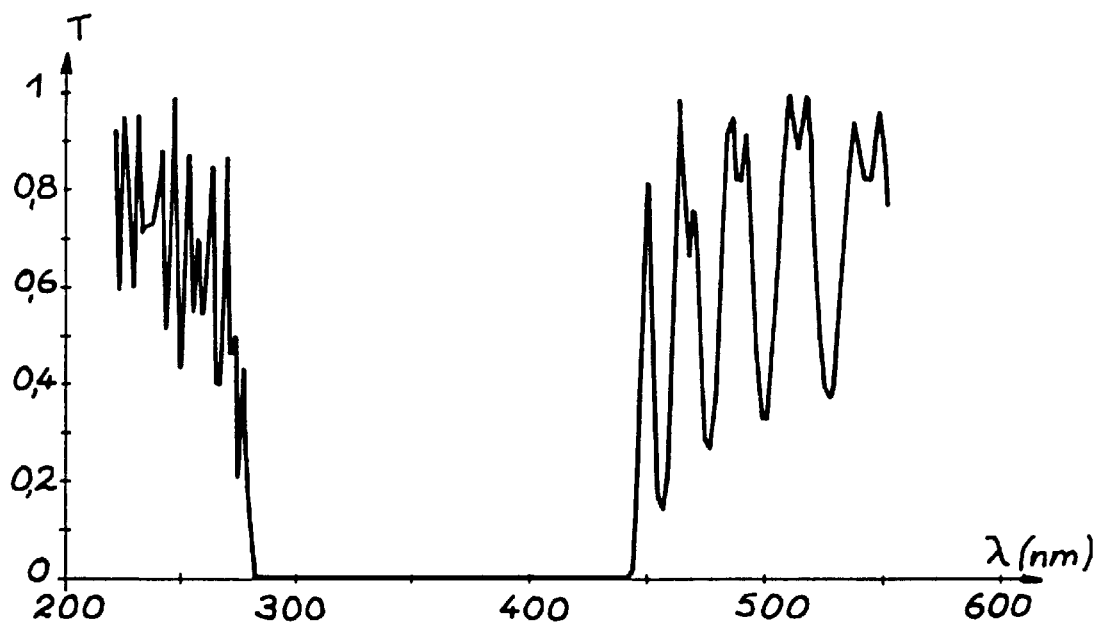
FIGS. 2A, 2B, 3A, 3B are transmission curves of prior art devices.
Figure 2B:
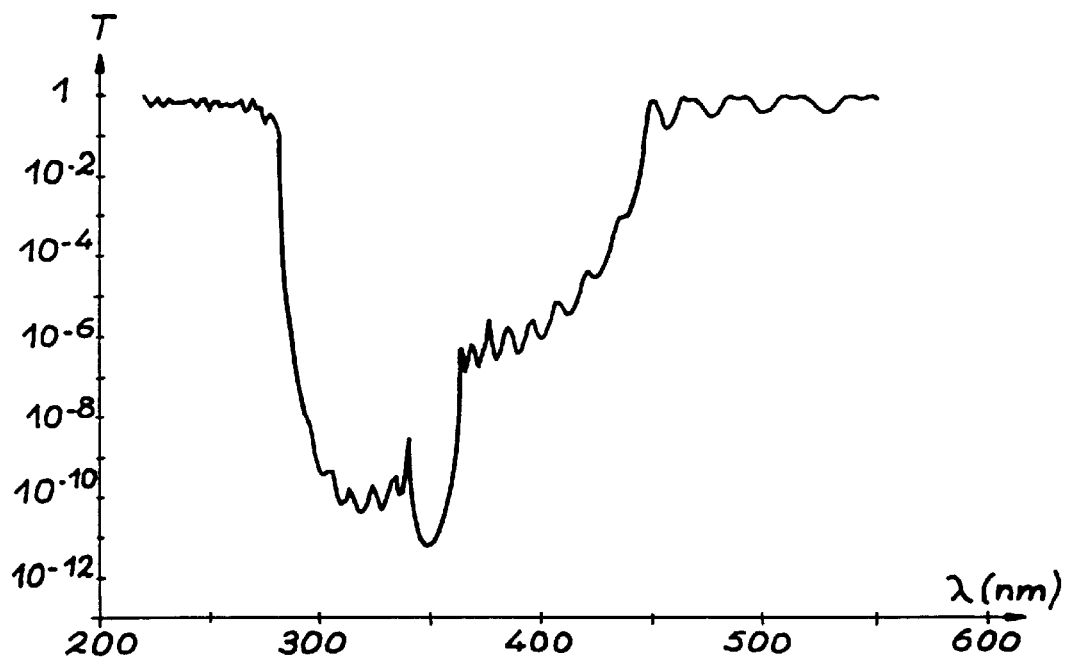
Figure 3A:
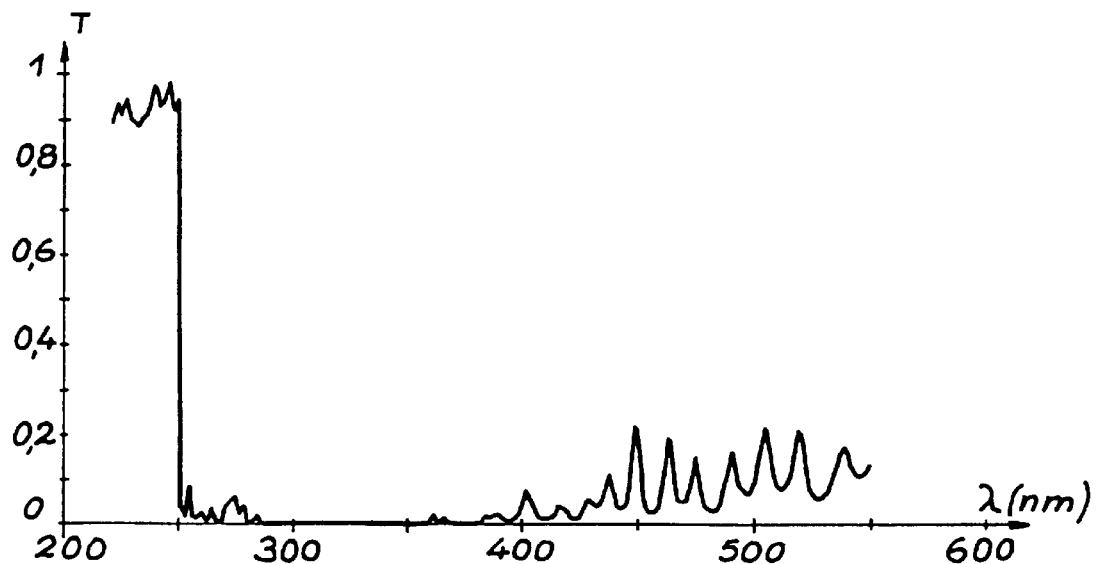
Figure 3B:
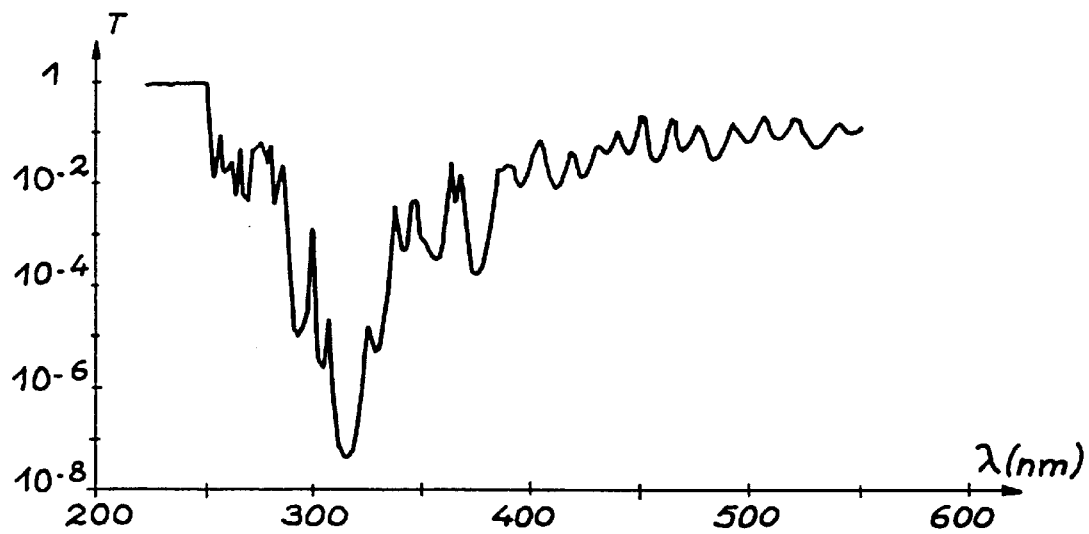

For solving the problem of the very low melting point of alkaline metals, it can be advantageous to use the technique illustrated in FIGS. 5A and 5B. The mirror structure 14 is first deposited on a substrate 16, for instance made of silica (for UV). The use of a sealing cell at a temperature greater than the melting point of the alkaline metal, enables the creation of the blocking film 12 under the mirror structure 14, between the silica substrate 16 and a second UV silica substrate 17.

For this purpose, spacers 18, 20 can be made of independent parts or studs etched in the UV silica. The overall sealing is ensured by seals 22, 24 (e.g. via a silk-screen process).

It is advantageous to place the components 26, 28 in thin films on both sides of the sealing cell for improving the transmission or rejection properties of the whole system. For instance, it is possible to create non-glare treatment films.

For this purpose, thin films of fluorides (LiF, $YF_3$, $BaF_2$, $CaF_2$, . . . ) can be deposited by vapor deposition.

By way of example, a thin film of 2000 nm rubidium is created on a silica substrate. A dielectric structure of ten films consisting of alternating a high index material marked H and a low index material marked B is deposited on the metal, e.g. with the following refractive indices:

$$nh=2,1, \; nb=1,4$$

The indications of these indices respectively correspond to the materials of MgO (or $Al_2O_3$) and $MgF_2$ type. The refractive indices of the thin film materials depend on the manufacturing conditions, and the values specified are not considered as reference values. Other combinations are possible, such as $YF_3/LiF$, $Al_2O_3/SiO_2$, . . . Use of fluorides is preferable because of the excellent transparency properties of these materials in the ultraviolet region.

Figure 6:
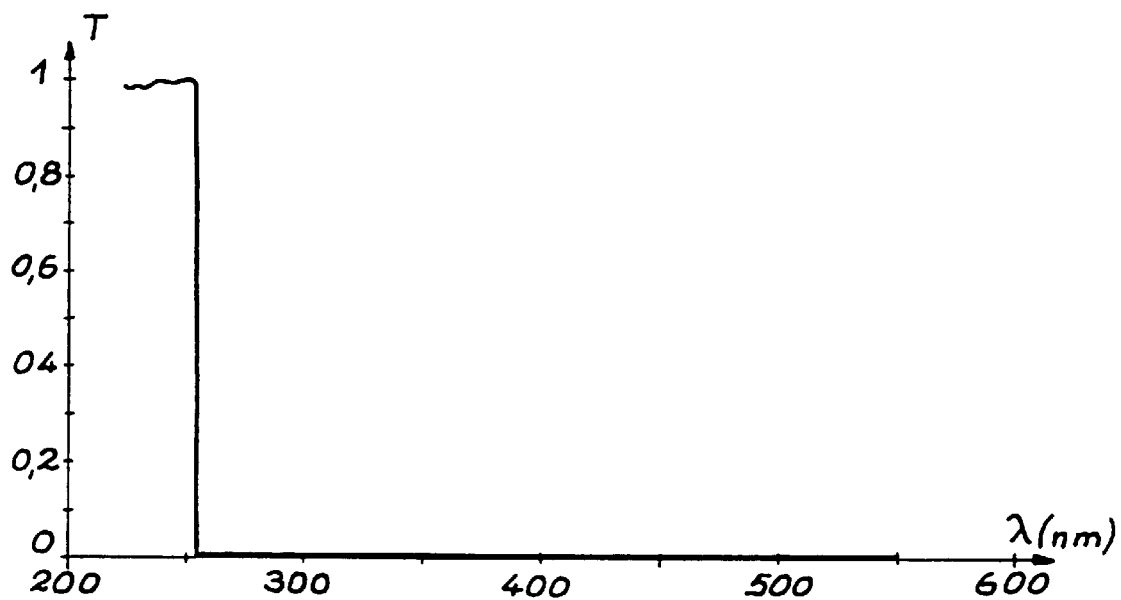
Figure 6:
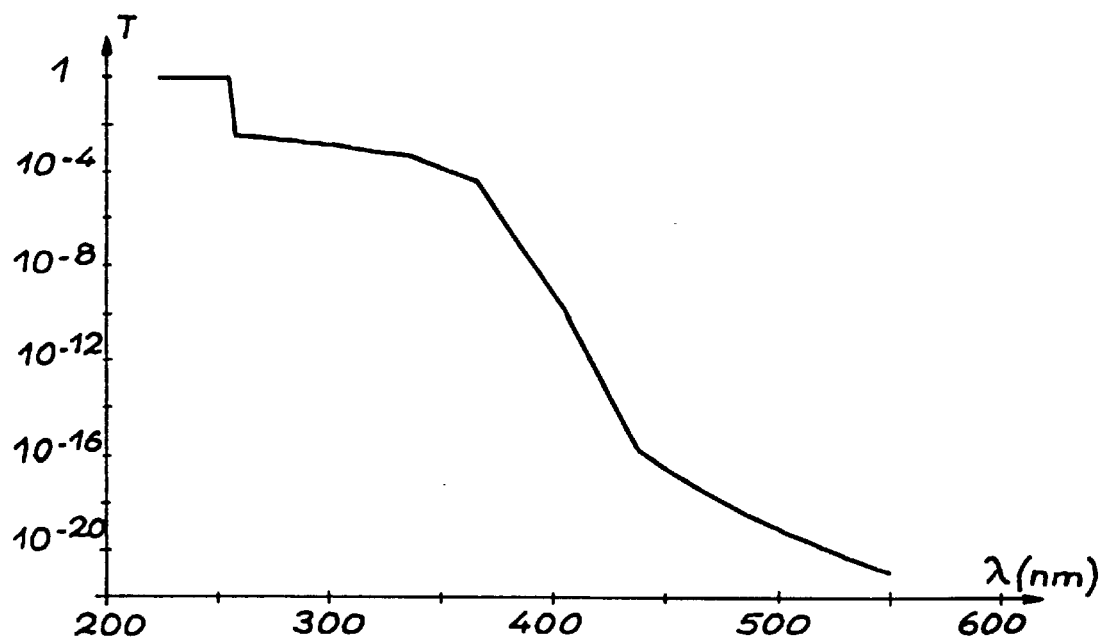

By using conventional digital methods, it is possible to improve the filter's anti-reflective properties. Such methods are revealed, e.g., in the publication by H. A. MacLeod titled "Thin film optical filters", Adam Hilger, 1986, p. 19–25. This optimization has been performed and results are mentioned in FIGS. 6A and 6B which represent respectively the transmission curves (T) at linear and logarithmic scales.

The cutoff wavelength of the filter according to the invention corresponds to the cutoff wavelength of the alkaline metal.

Moreover, the solution provided by the invention offers the following advantages:

UV transmission properties are very good (>98%), cutoff efficiency is better than that of known filters, because the residual transmission is almost equal to zero in the spectral region up to infrared (the metal extinction coefficient increases with the wavelength), the total thickness of the dielectric stacking is 2.25 μm. This is to be compared with a conventional structure that can be as thick as 5 to 10 μm (5.35 μm in the example already shown). Generally speaking, the total thickness depends on the material combinations and the manufacturing conditions, but remains low.

Figure 7A:
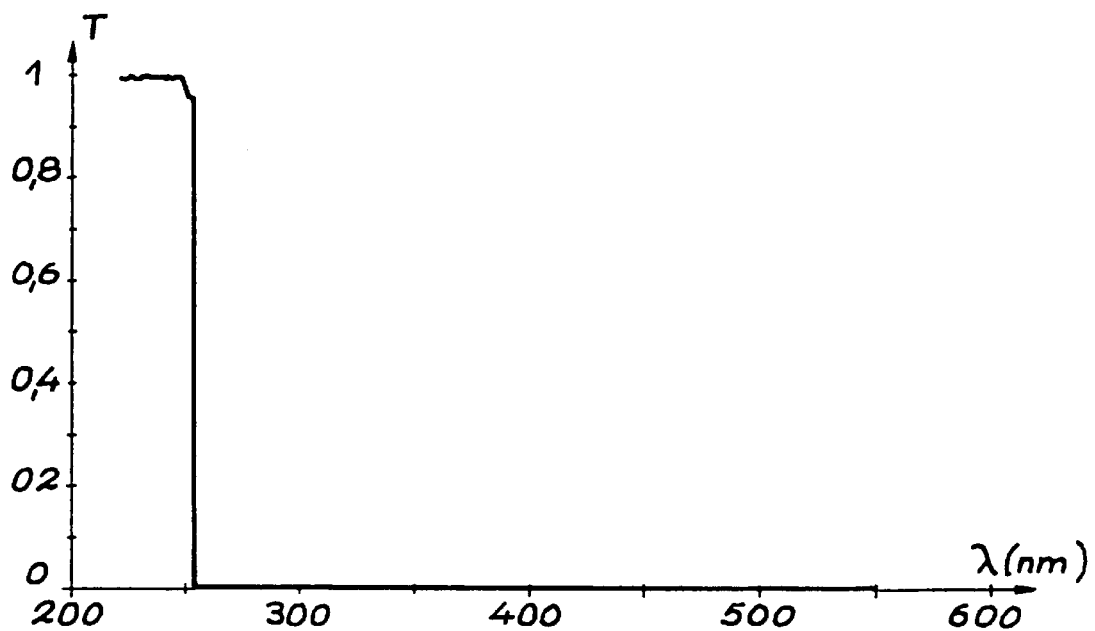
Figure 7B:
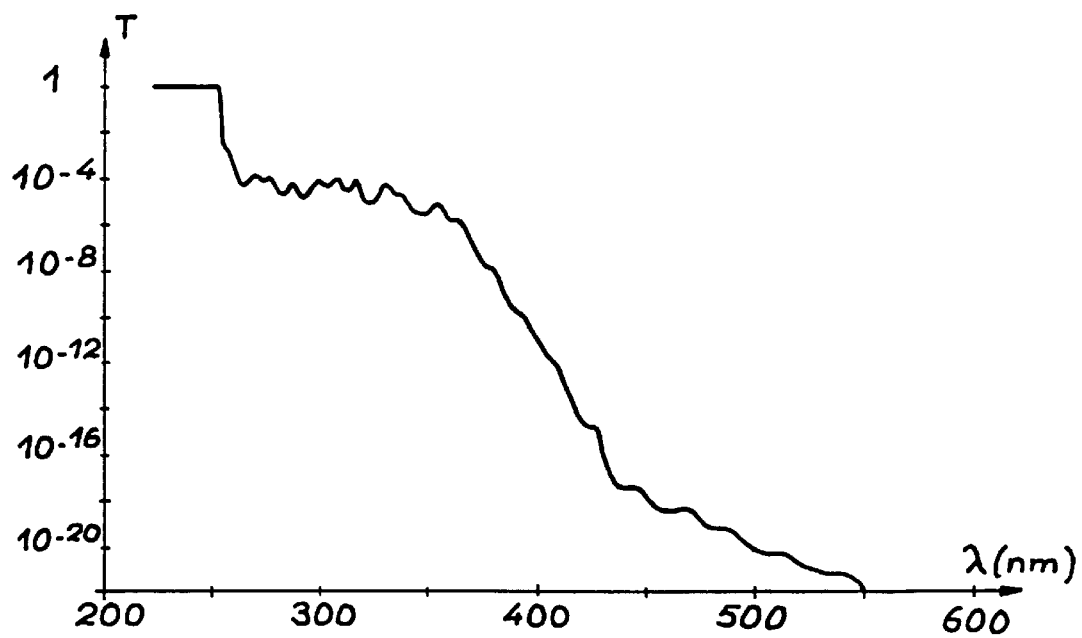

If it is wished to improve the rejection properties of the filter according to the invention, it can be advantageous to use a dielectric structure of the "offset mirror" type. The transmission coefficient of this structure is provided in FIGS. 7A and 7B (transmission curve, at linear (FIG. 7A) and logarithmic (FIG. 7B) scale).

This embodiment considerably improves the cutoff properties of the invention.

We claim:

1. A low-pass optical filtering device for the UV band, comprising:
   a dielectric stacking ensuring an anti-reflective function for $\lambda<\lambda_c$, where $\lambda_c$ is a cutoff wavelength of less than 300 nm,
   a metal base ensuring a reflective function for $\lambda<\lambda_c$.

2. A device according to claim 1, wherein the constituent metal of the base is an alkaline metal.

3. A device according to claim 1, wherein the constituent metal of the base is an alkaline-earth metal.

4. A device according to claim 1, wherein the dielectric stacking and its metal base lie on a substrate that is transparent in the ultraviolet band.

5. A device according to claim 4, wherein the substrate is opaque to a number of wavelengths greater than the critical wavelength $\lambda_c$.

6. A device according to claim 1, wherein the dielectric stacking comprises one or a plurality of components, in thin films, with anti-reflective properties.

7. A device according to claim 1, wherein the dielectric stacking is composed of alternating MgO or $Al_2O_3$ films and $MgF_2$ films or of alternating $Al_2O_3$ films and $SiO_2$ films.

8. A device according to claim 1, wherein the dielectric stacking is composed of alternating films made of fluorides.

9. A device according to claim 8, wherein the dielectric stacking is composed of alternating $YF_3$ films and LiF films.

10. A device according to claim 1, wherein the device has optimized anti-reflective properties.

11. A device according to claim 1, wherein the dielectric stacking is of the offset mirror type.

12. A method of manufacturing a low-pass optical filtering device for the UV band, comprising the following steps of:
    creating a dielectric stacking ensuring an anti-reflective function for $\lambda<\lambda_c$ where $\lambda_c$ is a so-called cutoff wavelength, of less than 300 nm,
    creating, on this dielectric stacking, a metal base ensuring a reflective function for $\lambda>\lambda_c$.

13. A method of manufacturing a low-pass optical filtering device for the UV band, comprising the following steps of:
    a. creating, on a UV transparent substrate, a metal base ensuring a reflective function for $\lambda>\lambda_c$, where $\lambda_c$ is a cutoff wavelength of less than 300 nm,
    b. creating, on the metal base, a stacking of dielectric films ensuring an anti-reflective function for $\lambda<\lambda_c$.

14. A method according to claim 13, wherein the substrate is located on a substrate base cooled below the melting point of the metal to be deposited for forming the metal base.

15. A method according to claim 12, wherein the dielectric stacking is created on a substrate, the metal base being created by means of a sealing cell at the melting point of the constituent metal of the metal base.

* * * * *